Feb. 2, 1971   B. L. JONES   3,560,090
PLATEN COVER

Filed July 26, 1968   4 Sheets-Sheet 1

INVENTOR.
BURTON L. JONES
BY
ATTORNEYS

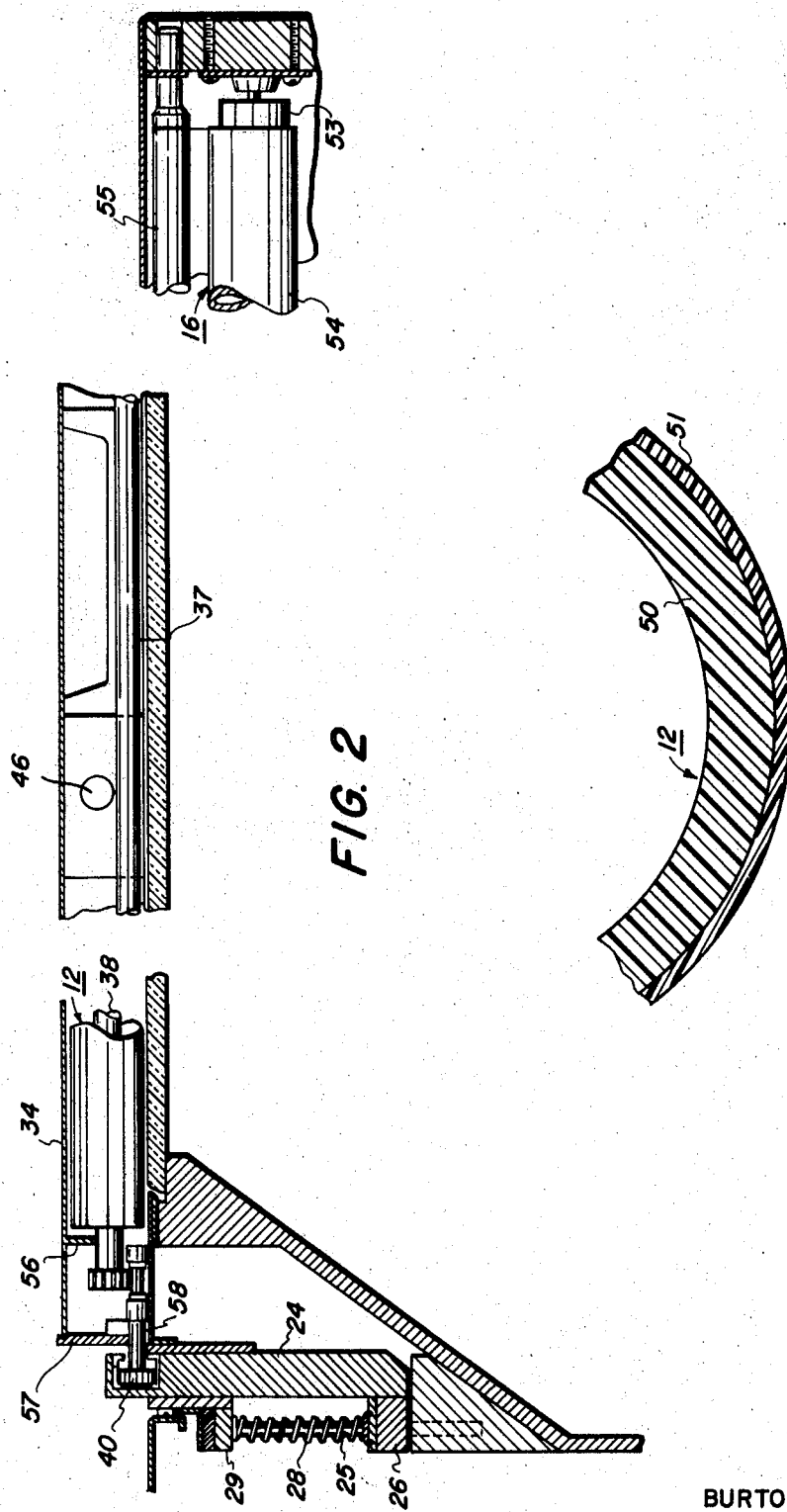

Feb. 2, 1971          B. L. JONES          3,560,090
PLATEN COVER
Filed July 26, 1968                4 Sheets-Sheet 4
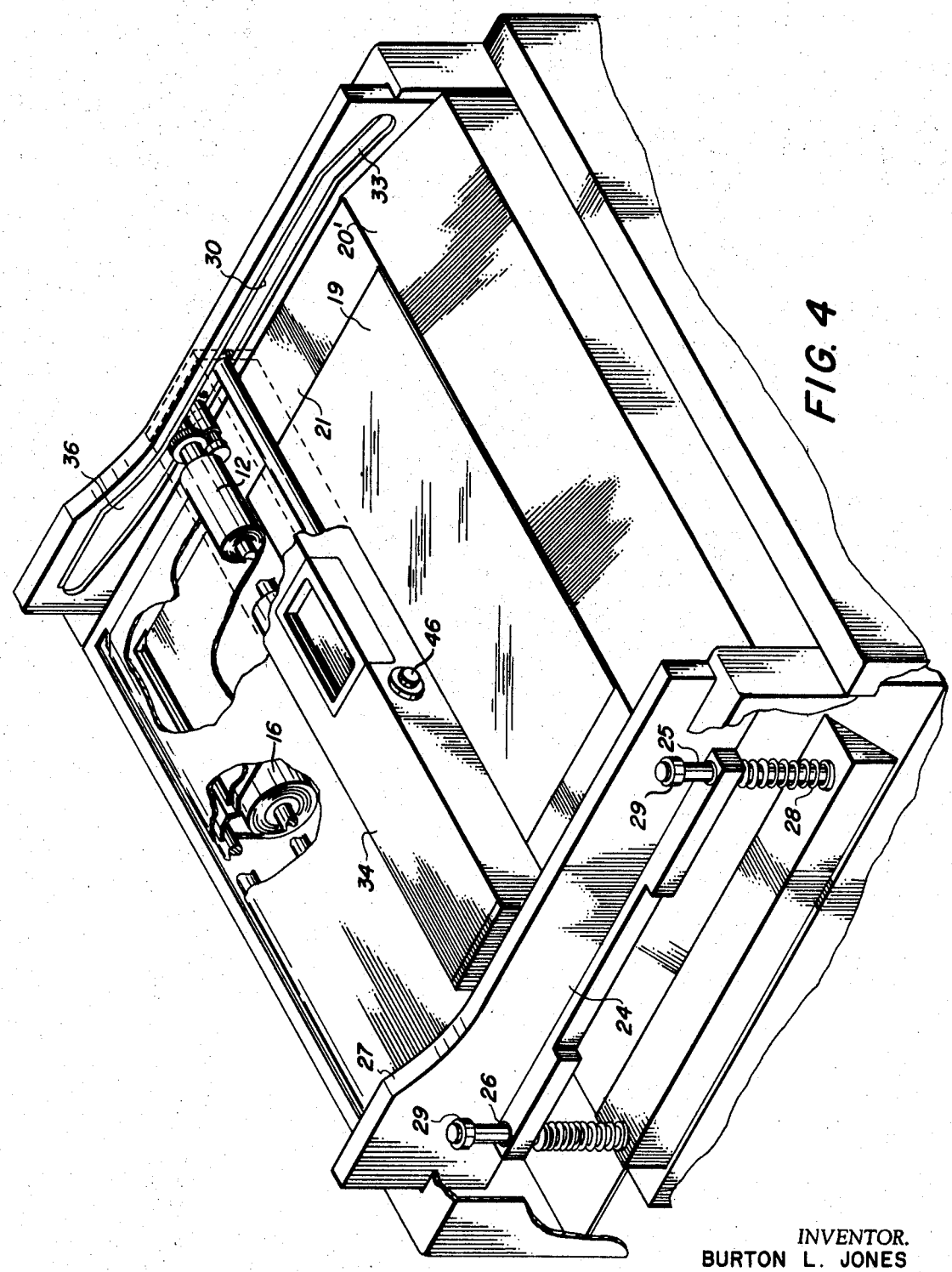
INVENTOR.
BURTON L. JONES

United States Patent Office 3,560,090
Patented Feb. 2, 1971

3,560,090
PLATEN COVER
Burton L. Jones, Fairport, N.Y., assignor to Xerox Corporation, Rochester, N.Y., a corporation of New York
Filed July 26, 1968, Ser. No. 747,907
Int. Cl. G03b 27/62
U.S. Cl. 355—82       10 Claims

ABSTRACT OF THE DISCLOSURE

A cover for a platen employing a pair of curtains which are drawn in succession from rolls over the platen. The first or leading curtain is of a size sufficient to at least cover the transparent portion of the platen when unrolled and consists of a material with inherent self-coiling tendencies. The second or trailing curtain is larger than the first curtain and covers the entire platen area including the first curtain when unrolled. A draw carriage supported for movement across the platen area in a pair of liftable track members is provided. One end of each curtain is attached to the carriage so that drawing of the carriage across the platen area unrolls both curtains in succession onto the platen and any document resting thereon. Where the document is relatively thick, the liftable track members enable the carriage to be raised for passage over the document.

---

This invention relates to a platen cover, and more particularly, to a retractable platen cover.

It is usually desirable to cover the transparent platen surface of document copying or reproduction machines, such as electrostatic copiers and the document being copied during the copying cycle. This is done to assure contact of the entire surface of the document with the platen glass and to prevent movement of the document during the copying process. At the same time, covering the document enhances document illumination while shielding the operator from bothersome glare.

It is a principal object of the present invention to provide a new and improved cover for the platen of a document copying or reproducing machine.

It is a further object of the present invention to provide a roll type curtain cover for the transparent platen of a copying machine, the cover having an inherent self-coiling tendency to facilitate retraction of the cover and uncovering of the platen.

It is an object of the present invention to provide an improved apparatus for covering the transparent platen of a copying machine comprising a light-reflective primary curtain adapted to cover the transparent portion of the platen and a secondary trailing curtain adapted to cover substantially the entire platen including the primary curtain.

It is an object of the present invention to provide a curtain roll type cover for covering the platen of a document copying machine incorporating means to permit raising of the cover to accommodate relatively thick documents.

This invention relates to a copying apparatus including, in combination, a housing; a transparent platen for supporting documents to be copied; a carriage; means supporting the carriage for movement across the platen, the supporting means being liftable to enable the carriage to be moved over relatively thick documents on the platen; a self-coiling curtain roll on the carriage, the free end portion of the curtain being secured to the housing whereby movement of the carriage across the platen unrolls the curtain onto the platen against the self-coiling bias of the curtain, the curtain being sized to substantially cover the platen when unrolled; and means to retain the carriage in selected position with the curtain extended, release of the retaining means enabling the carriage to be retracted with the help of the self-coiling bias of the curtain to recoil the curtain and uncover the platen.

Other objects and advantages will be apparent from the ensuing description and drawings in which:

FIG. 2 is a front sectional view of the platen cover shown in FIG. 1;

FIG. 3 is a top plan view of the platen cover shown in FIG. 1;

FIG. 4 is an isometric view with the parts broken away illustrating the platen cover of the present invention;

FIG. 5 is an enlarged cross sectional view of the platen cover curtain material.

Figure 1:
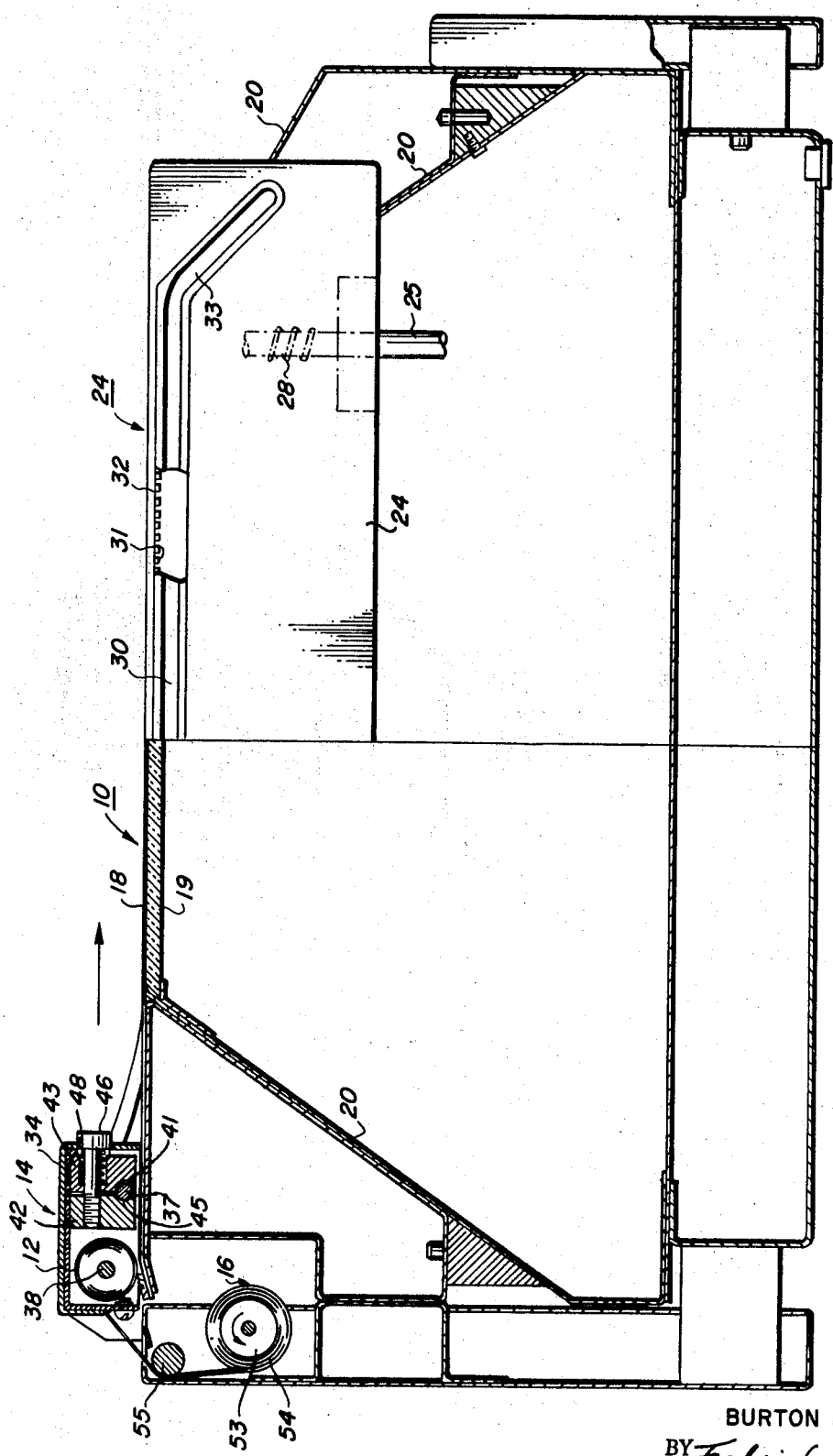
FIG. 1 is a side view in section showing the platen cover of the present invention.

Referring now to the drawings, there is shown the platen cover, designated generally by the numeral 10 of the present invention. As will appear more fully, platen cover 10 is adapted to cover the transparent platen of a document copying or reproducing machine, such as an electrostatic type copier (not shown) and the item, such as a document resting thereon to prevent movement of the document during the copying process and enhance document illumination.

Platen cover 10 includes a carriage 14 movable across the platen surface 18, a first or primary curtain 12, and a trailing second or secondary curtain 16, curtains 12, 16 being adapted to unroll and cover platen surface 18 on movement of carriage 14 thereacross.

Referring particularly to FIGS. 1–4 of the drawings, platen surface 18 includes a transparent glass 19 bounded on three sides by surfaces 21, 22 respectively of frame 20. Platen glass 19, which enables the document being copied to be viewed by the copying machine (not shown), is normally rectangular in shape although other configurations may be readily contemplated. And while platen glass 19 is shown as being flat, it will be understood that glass 19 may be curved.

As is understood by those skilled in the art, the document to be copied is normaly placed face down on platen glass 19, the lower side thereof being illuminated by a suitabe light source (not shown) during the copy cycle.

Platen glass 19 is supported by a suitable frame 20. In the exemplary embodiment shown, the upper portion of frame 20 is generally trapezoidal in shape. Boundary surfaces 21, 22, of frame 21 extend outwardly from the sides and rear respectively of glass 19, but slightly below the level of platen glass 19 to facilitate positioning of documents and particularly oversize documents on platen glass 19 and to enable accessory devices such as an automatic document feeder (not shown) to be used. Forward edge 19' of platen glass 19 may be rimless to facilitate sliding documents onto and off of glass 19 and to accommodate foldable documents such as books.

A pair of movable plate-like track members 24 are arranged along the sides of platen glass 19 at the outer extremities of boundary surfaces 21. Members 24 are mounted for up and down movement on rods 25, as by journals 26 secured to the exterior walls thereof. Stops 29 adjacent the top of rods 25 limit upward movement of members 24. Springs 28 bias members 24 downwardly.

Track members 24 slope upwardly adjacent the rear thereof to present a raised portion 27. A generally longitudinal slot-like recess or track 30 with inclined front and rear segments 33, 36, respectively, extends along the interior wall of members 24 adjacent the top edge thereof. Front segment 33 slopes downwardly above the inclined face 20' of platen support frame 20. Rear segment 36 slopes upwardly into raised rear portion 27 of track members 34. The intermediate track segment 23 preferably parallels platen surface 18.

As will appear more fully, rear segment 36, which rises above intermediate segment 23, cooperates with carriage 14 to hold the forward portion of track members 24 on a level with or slightly below the level of platen surface 18 when carriage 14 is retracted. Tracks 30 are provided with gear teeth 31, which may comprise internally toothed inserts 32 suitaby secured within tracks 30 as by bonding.

As best seen in FIGS. 1–3 of the drawings, carriage 14 comprises a transverse housing 34, the longitudinal extent of which is slightly less than the distance between track members 24. Housing 34, which has a generally inverted U-shape when viewed in cross section, includes spaced inside and outside end plates 56, 57, respectively. A pair of shafts 37, 38 for supporting carriage 14 and primary curtain 12 respectively, are disposed within carriage housing 34. Shaft 37 is rotatably journaled in outer end plates 57 adjacent the front of carriage housing 34 with the terminal ends thereof projecting into tracks 30. Shaft 38, which is rotatably journaled in inner end plates 56 adjacent the rear of carriage housing 34 at a level adequate to permit primary curtain 12 to freely coil therearound, parallels shaft 37. Stub shafts 58 are rotatably journaled in outer end plates 57 below shaft 38 and adjacent the rear of housing 34, the ends of shafts 58 projecting into tracks 30. The axes of shafts 37, 58 preferably lie in a common plane paralleling platen surface 18. Externally toothed gears 40 are mounted on the outer ends of shafts 37, 58, gears 40 meshing with gear teeth 31 in tracks 30 to support carriage 14 for back and forth movement across platen surface 18. As can be understood, the spaced relationship of shafts 37, 58 with one another combines with the interengagement of gears 40 with gear teeth 31 to assure movement of carriage 14 in a straight line without cocking or twisting thereof.

Shaft 37 is preferably roughened as by knurling at 41. A pair of relatively movable gripper or brake elements 42, 43 are arranged on opposite sides of shaft 37. Brake element 42 has a semi-circular braking surface 45 engageable with knurled portion 41 of shaft 37. Brake control 46, which may be secured to element 42, projects through element 43 and front wall 34' of carriage housing 34. Compression spring 48 disposed between control 46 and element 43, biases brake element 42, 43 into gripping engagement with knurled portion 41 of shaft 37 to prevent rotation of shaft 37 and movement of carriage 14.

Primary curtain 12 is normally in roll form and supported in carriage 34 on shaft 38. The free end of curtain 12 is suitably fixed to frame 20 adjacent rear boundary surface 22. The width of curtain 12 is at least equal to and preferably somewhat greater than the dimension between side boundary surfaces 21 whereby curtain 12 may cover the platen glass 19 and any document resting thereon when unrolled. Primary curtain 12 is comprised of a material that is inherently self-coiling and has suitable photo-electric light reflective properties.

Referring to FIG. 5 of the drawings, curtain 12 is preferably fabricated from a supporting or base layer 50 of flexible plastic having bonded to the lower surface thereof a second layer 51 such that the layers 50, 51 are in shear tension relative to one another tending to cause the curtain 12 to assume a coil shape. Inner layer 51 is comprised of a suitable flexible plastic material having desired photo-electric light reflective properties such as white plastic. Alternately, the inside surface of layer 51 may be coated with a suitable light reflective substance.

It is understood that outer layer 50 may, in the alternative comprise one or more individual strip like portions. It is understood that the inherent self-cooling bias of primary curtain 12 tends to retract carriage 14 and uncover platen glass 19.

Referring especially to FIGS. 1 and 2 of the drawings, secondary curtain 16 includes supporting roller 53 mounted on frame 20 behind carriage 14 and below platen surface 18. A length of suitable curtain material 54 is wrapped around roller 53. Suitable torsion spring means (not shown) biases roller 53 in a counterclockwise direction as shown by the solid line arrow in FIG. 1 of the drawings. The free end of curtain 54 is attached to rear of carriage 14. To facilitate movement of curtain 16 onto platen surface 18, a transfer roller 55 is journaled on frame 20 between secondary curtain roller 53 and carriage 14.

The width of secondary curtain 16 is at least equal to and preferably slightly greater than the distance between track members 24 to assure complete covering of platen surface 18 and primary curtain 12 upon unwinding of secondary curtain 16. The exterior surface of curtain 16 may have a suitable decorative finish to enhance the aesthetic appearance of platen cover 10 when covering platen surface 18.

The curtain material for secondary curtain 16 may comprise an inherently self-coiling material of the type described heretofore in conjunction with primary curtain 12. In that event, the layers 50, 51 are reversed base layer 50 forming the inside surface of the secondary curtain with the light reflective layer 51, which may instead have a suitable decorative coating thereon, on the outside. Where secondary curtain 14 is comprised of an inherently self-coiling material, support roller 53 is preferably replaced by a supporting shaft about which the roll of self-coiling curtain material is disposed.

Carriage 14, under the self-coiling bias of curtains 12, 16 is normally in a retracted position on rear platen boundary surface 22. Primary and secondary curtains 12, 16, respectively, are substantially rolled up and platen glass 19 uncovered. Gears 40 of carriage support shafts 37, 58 which are disposed within rear track segments 36 maintain the forward portion of track members 24 at or slightly below the level of platen surface 18. This enables items such as large size documents or rigid documents to be placed on platen surface 18.

Following positioning of the item to be copied, such as a document, on platen glass 19, brake control 46 is depressed against the bias of spring 48 to release braking element 42 and free shaft 37 for rotation. This permits carriage 14 to be drawn or pulled forward (in the direction of the solid line arrow in FIG. 1). As carriage 14 moves forward across platen surface 18, primary curtain 12 unrolls over platen glass 19 and the document resting thereon. At the same time, the trailing secondary curtain 16 is pulled over primary curtain 12 and platen surface 18.

On initial forward movement of carriage 14, gears 40 on shafts 37, 58 move along downwardly inclined track segments 36 and into intermediate track segments 33. Movement of gears 40 through track segments 36 forceably raises track members 24 upwardly against the bias of springs 28. Where the item being copied is relatively thin, such as single page document, track members 24 are raised the relatively short distance above the level of platen surface 18 necessary to expose tracks 30 and enable carriage 14 to be moved across the platen surface 18. Where the item to be copied on platen glass is relatively thick, such as a book carriage 14 and track members 24 are raised upwardly to a height required for carriage 14 to pass thereover and unroll curtains 12, 16, over the item being copied. It is understood that stops 29 prevent track members 24 from being lifted off of supporting rods 25.

The forward movement of carriage 14 in tracks 30 unrolls curtains 12, 16 over the platen surface 18, covering platen glass 19 and the item being copied. Brake control 46 when released, permits brake element 42 to grippingly engage knurled portion 41 of shaft 37 and hold carriage 14 in selected position with curtains 12, 16 covering platen surface 18.

In instances where a foldable item such as a book is being copied and the page to be copied rests face down on platen glass 19 with a portion of the item resting on face 20' of support frame 20, the downward movement of carriage 14 in forward track segments 33 aids in retaining the item in place on platen glass 18 and assures complete covering thereof by curtains 12, 16.

When copying is completed, brake control 46 is depressed to disengage brake element 42 and free shaft 37 for rotation. The self-coiling bias of curtains 12, 16 aids in retracting carriage 14 to uncover the platen surface 18 and permit the item copied to be removed. On retraction of carriage 14, movement of support shafts 37, 58 upwardly through sloping segment 36 of tracks 30 depresses track members 24 to carry the forward portion thereof to the level of or slightly below platen surface 18 to facilitate removal and/or addition of the next item to be copied.

According to the preferred form of the invention, the self-coiling bias of primary and second curtains 12, 16 respectively is not ordinarily sufficient of itself to retract carriage 14. A slight pushing effort by the user is required to retract the carriage and uncover the platen. This construction reduces the force required of the user to draw carriage 14 forward and unroll curtains 12, 16. It is appreciated however that platen cover 10 may be constructed so that the return bias exercised by curtains 12, 16 is sufficient of itself, when brake control 46 is released, to retract carriage 14 and uncover the platen.

While I have described and illustrated herein a preferred form of my invention, it will be apparent to those skilled in the art that changes and modifications may be made thereto without departing from the spirit and intent of my invention which is to be limited only to the scope of the appended claims.

What is claimed is:

1. In a copying apparatus including a housing and a transparent platen for supporting a document for copying, the combination of:

a carriage, means supporting said carriage for movement across said platen, said supporting means including a pair of track members on opposite sides of said platen, with means mounting said track members for raising movement above said platen whereby to enable said carriage to be lifted over relatively thick documents on said platen;

a self-coiling curtain roll on said carriage, the free end portion of said curtain being secured to said housing whereby movement of said carriage across said platen unrolls said curtain onto said platen against the self-coiling bias of said curtain, said curtain being sized to substantially cover said platen when unrolled; and, means to retain said carriage in selected position with said curtain extended, release of said retaining means enabling said carriage to be retracted and said curtain recoiled to uncover said platen.

2. The apparatus according to claim 1 in which said track members each include a track extending from a carriage retracted point proximate one platen end toward the opposite end thereof, said carriage being movable in said tracks, said tracks each having an upwardly sloping portion adjacent said one platen end so that on retraction of said carriage, said carriage cooperates with said upwardly sloping track portion to depress said track members and the remaining portion of said track below the level of said platen.

3. The apparatus according to claim 2 in which said housing includes a downwardly sloping face adjacent said platen opposite end, said track members projecting beyond said platen opposite end and including a downwardly sloping track portion above said housing face adapted to guide said carriage downwardly on movement of said carriage beyond said platen opposite end to assure covering of said platen by said curtain.

4. The apparatus according to claim 2 in which said track member mounting means includes stop means to limit raising movement of said track members above said platen.

5. The apparatus according to claim 2 in which said track members comprise a pair of plate-like parts, said tracks comprising a longitudinally projecting slot-like recess in the inside wall of said parts, at least one side of said recesses being toothed; said carriage supporting means including at least one transverse shaft extending between said recesses; and rotatable gear means on said shaft in meshing engagement with said recess toothed sides and cooperable therewith to prevent twisting of said carriage on movement of said carriage across said platen.

6. The apparatus according to claim 1 including a second curtain roll supported by said housing the free end portion of said second curtain being secured to said carriage so that movement of said carriage across said platen to unroll said first mentioned curtain unwinds said second curtain over said first curtain; said second curtain being sized larger than said first curtain.

7. The apparatus according to claim 6 in which said second curtain roll is supported below the level of said platen, and means for guiding said second curtain onto said platen.

8. The apparatus according to claim 6 in which said second curtain is sized to extend between said track members.

9. In a copying apparatus including a housing and a transparent platen for supporting a document for copying, the combination of:

a carriage, means supporting said carriage for movement across said platen, a curtain roll supported on said carriage, the free end portion of said curtain being secured to said housing whereby movement of said carriage across said platen unrolls said curtain onto said platen, said curtain being sized to substantially cover said platen when unrolled; and a second trailing curtain roll supported on said housing, the free end portion of said second curtain being secured to said carriage so that movement of said carriage across said platen to unroll said first mentioned curtain unrolls said second curtain over said first curtain;

said second curtain being larger than said first curtain.

10. The apparatus according to claim 9 in which said first curtain is comprised of self-coiling material, the surface of said first curtain opposite said platen being light reflective.

References Cited

UNITED STATES PATENTS

| | | | |
|---|---|---|---|
| 2,438,225 | 3/1948 | Martin | 355—78 |
| 3,064,546 | 11/1962 | Hutchins | 355—99 |
| 3,451,752 | 6/1969 | Frank | 355—8 |

JOHN M. HORAN, Primary Examiner

M. HARRIS, Assistant Examiner

U.S. Cl. X.R.

355—91, 99, 133